United States Patent
Mandakolathur et al.

(10) Patent No.: US 9,166,902 B1
(45) Date of Patent: Oct. 20, 2015

(54) PER-PORT MULTICAST PROCESSING

(75) Inventors: Karthik Subramanian Mandakolathur, Milpitas, CA (US); Hsitung Huang, Saratoga, CA (US); Sha Ma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 13/618,056

(22) Filed: Sep. 14, 2012

(51) Int. Cl.
*H04L 12/28* (2006.01)
*G01R 31/08* (2006.01)
*H04L 12/761* (2013.01)
*H04L 12/18* (2006.01)

(52) U.S. Cl.
CPC ............ *H04L 45/16* (2013.01); *H04L 12/185* (2013.01)

(58) Field of Classification Search
CPC ............................ H04L 45/16; H04L 12/185
USPC ......................................... 370/390, 230, 235
See application file for complete search history.

(56) References Cited

U.S. PATENT DOCUMENTS

| | | | |
|---|---|---|---|
| 7,280,542 B2 * | 10/2007 | Hassan-Ali et al. | 370/395.1 |
| 7,809,009 B2 | 10/2010 | Tatar et al. | |
| 8,184,628 B2 | 5/2012 | Cai et al. | |
| 2003/0061227 A1 * | 3/2003 | Baskins et al. | 707/101 |
| 2011/0170542 A1 | 7/2011 | Liu et al. | |
| 2012/0002546 A1 * | 1/2012 | Sundararaman et al. | 370/235 |
| 2012/0275301 A1 * | 11/2012 | Xiong | 370/230 |
| 2012/0275304 A1 * | 11/2012 | Patel et al. | 370/230.1 |

* cited by examiner

*Primary Examiner* — Omar Ghowrwal
*Assistant Examiner* — Angel Brockman
(74) *Attorney, Agent, or Firm* — Edell, Shapiro & Finnan, LLC

(57) ABSTRACT

In a multicast networking device having a plurality of output ports, a hierarchical packet scheduling tree is generated for a first port. The hierarchical packet scheduling tree is generated from a transmission queue for the first port. A sequential search of the hierarchical scheduling tree is performed to determine a packet pointer to a first packet in the transmission queue of the first port. Based on the packet pointer, packet data for the first packet is obtained and the first packet comprising the packet data is transmitted to a destination device via the first port.

24 Claims, 9 Drawing Sheets

US 9,166,902 B1

PER-PORT MULTICAST PROCESSING

TECHNICAL FIELD

The present disclosure relates to scheduling multicast packets for transmission.

BACKGROUND

Traditional Internet Protocol (IP) communication allows a source device to send packets to a single network-connected destination device (unicast transmission) or to all network-connected destination devices (broadcast transmission). A third technique, referred to as multicast transmission or multicasting, has evolved to support increased demands for various audio and video applications (e.g., online conferences, video on demand, etc.) that involve high data rate transmission to multiple (but not all) destination devices.

Multicasting is a form of communication that allows a source device to send an IP packet to a network for distribution to multiple destination devices. The network usually includes at least one multicast-enabled networking device (e.g., router or other switching device) configured to replicate the packet and forward the replicated packets to the multiple destination devices. Multicast-enabled networking devices typically include a centralized controller to replicate the received packets, and one or more output interfaces (ports) to forward the replicated packets to the destination devices over various data links.

DESCRIPTION OF EXAMPLE EMBODIMENTS

Overview

In a multicast networking device having a plurality of output ports, a hierarchical packet scheduling tree is generated for a first port. The hierarchical packet scheduling tree is generated from a transmission queue for the first port. A sequential search of the hierarchical scheduling tree is performed to determine a packet pointer to a first packet in the transmission queue of the first port. Based on the packet pointer, packet data for the first packet is obtained and the first packet comprising the packet data is transmitted to a destination device via the first port.

Example Embodiments

Figure 1:
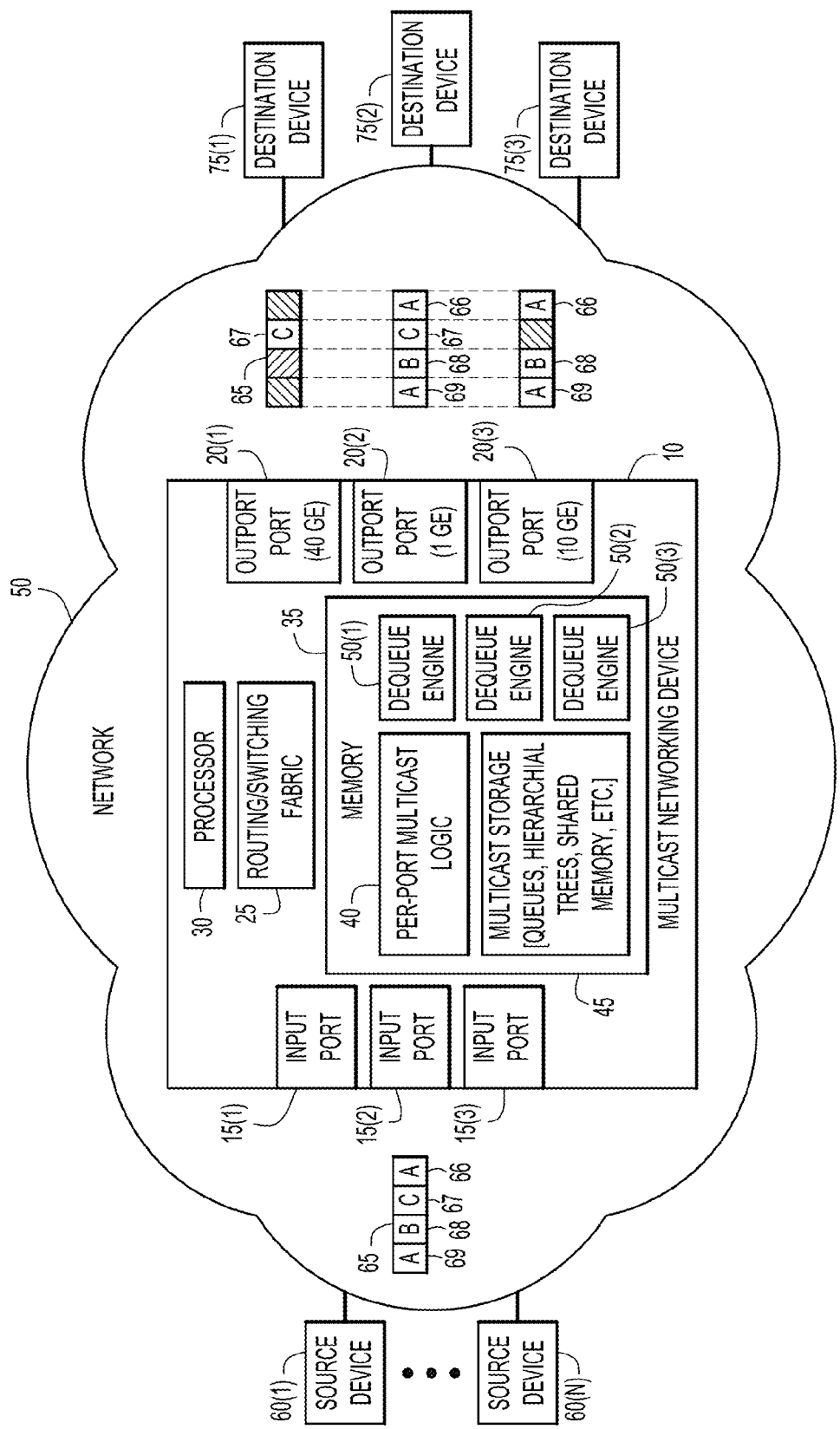
FIG. 1 is a block diagram of a multicast networking device configured to execute per-port multicast processing.

FIG. 1 is a block diagram of a multicast networking device 10 (e.g., router or other switching device) configured to execute per-port multicast techniques. Multicast networking device 10 comprises input ports 15(1), 15(2), and 15(3), output ports 20(1), 20(2), and 20(3), a routing/switching fabric 25, a processor 30, and a memory 35. Memory 35 comprises port-based multicast logic 40, multicast storage 45, and a dequeue engines (machines) 50(1), 50(2), and 50(3). Multicast networking device 10 is part of a communications network 50 and is generally configured to replicate packets received from source devices 60(1)-60(N) and forward the replicated packets to the multiple destination devices 75(1)-75(3). It is to be appreciated that multicast networking device 10 of FIG. 1 is merely an example and that the per-port multicast processing techniques may be deployed in a number of different networking devices have different configurations of the above and other elements as known in the art.

Input ports 15(1), 15(2), and 15(3) and output ports 20(1), 20(2), and 20(3) may be provided by one or more line cards. In the example of FIG. 1, output port 20(1) is a 40 Gigabit Ethernet (40GE) port, port 20(2) is a 1 Gigabit Ethernet (1GE) port, and port 20(3) is a 10 Gigabit Ethernet (10GE) port.

The multicast storage 45 of memory 35 may include one or more packet queues, one or more hierarchical packet scheduling structures (as described below), packet data, etc. The dequeue engines 50(1), 50(2), and 50(3) are associated with port 20(1), port 20(2), and port 20(3), respectively. The dequeue engines 50(1), 50(2), and 50(3) each include logic that enables the processor 30 to dequeue packet information from queues and logic that allows the processor 30 to perform the operations described further below.

Memory 35 may comprise read only memory (ROM), random access memory (RAM), magnetic disk storage media devices, optical storage media devices, flash memory devices, electrical, optical, or other physical/tangible memory storage devices. The processor 30 is, for example, a microprocessor or microcontroller that executes instructions for the per-port multicast logic 40 and dequeue engines 50(1), 50(2), and 50(3). Thus, in general, the memory 35 may comprise one or more tangible (non-transitory) computer readable storage media (e.g., a memory device) encoded with software comprising computer executable instructions and when the software is executed (by the processor 30) it is operable to perform the operations described herein in connection with per-port multicast logic 40, dequeue engines 50(1), 50(2), and 50(3), and, more generally, the per-port multicast techniques.

In operation, incoming packets are received at one of the input ports 15(1)-15(3) from a source device 60(1)-60(n). An example sequence of packets received from source devices 60(1)-60(n) is shown in FIG. 1 as packet sequence 65. Packet sequence 65 includes packets from three different flows, where packets from each of the first, second, and third flows are represented in packet sequence 65 by one of the letters A, B, and C, respectively. As shown, packet sequence 65 includes the letters A, B, C, and A, meaning that the first packet 66 is from the first flow (flow A), the second packet 67 is from the third flow (flow C), the third packet 68 is from the second flow (flow B), and the fourth packet 69 is from the first flow (A).

Per-port multicast logic 40 is executed by processor 30 so that the processor 30 may perform packet processing of the received packets 66-69. In general, this processing may include replication of the received packets 66-69 and forwarding of the packets via routing/switching fabric 25 to one or more of the output ports 20(1), 20(2), and 20(3) for transmission to one or more of the destination devices 75(1), 75(2), and 75(3). In the example of FIG. 1, the first packet 66 is replicated and forwarded to output ports 20(2) and 20(3), the second packet 67 is replicated and forwarded to output ports 20(1) and 20(2), the third packet 68 is replicated and forwarded to output ports 20(2) and 20(3), and the fourth packet 69 is replicated and forwarded to output ports 20(2) and 20(3). The packet processing by processor 30 may further include, for example, header processing for routing/switching, quality-of-service (QoS) processing (e.g., packet scheduling and packet shaping), etc.

Packet replication is known in the art and, as such, the details of packet replication are not provided herein. In addition, any specific elements of multicast networking device 10 that may be used to perform such packet replication (e.g., buffers, controllers, control lists, lookup circuits, replication tables, etc.) have been omitted from FIG. 1 for ease of illustration.

As noted, port 20(1) is, for example, a 40GE port that subscribes only to the third flow C, port 20(2) is a 10GE port that subscribes to all three flows A, B, and C, and port 20(3) is a 1 GE that subscribes only to the first and second flows A and B. In a conventional multicast networking device, although port 20(1) only subscribes to one flow and operates at a faster speed than the other ports 20(2) and 20(3), port 20(1) cannot send the replicated packet 67 from the third flow until the replicated packet 66 is first sent by ports 20(2) and 20(3). This performance-limiting phenomenon is referred to as Head-of-line blocking (HOL blocking or HOLB) and results, for example, from the slower speeds of ports 20(2) (1GE) and 20(3) (10GE) relative to port 20(1) (40GE), flow-specific restrictions relating to the first flow A, etc.

Certain conventional arrangements use a per-packet queue data structure where the egress processing elements (i.e., egress dequeue engines) can only locate the first packet in any sequence, thereby suffering from HOL blocking issues. Other conventional arrangements attempt to prevent HOL blocking by using ingress multicast packet replication. However, ingress multicast packet replication is costly in terms of silicon real-estate and may not be practical for certain applications (e.g., switch-on-chip solutions).

Presented herein are per-port multicast processing techniques that are configured to prevent such HOL blocking issues without the need for the costly ingress multicast packet replication. More specifically, the per-port multicast processing techniques use a per-port hierarchical data structure that enables the ports to locate queued packets and transmit those packets independently and immediately (i.e., without waiting for other ports to transmit). In other words, in the example of FIG. 1, port 20(1) is able to immediately send the replicated packet 67 without having to wait until after slower ports 20(2) and 20(3) send the replicated packets 66.

As described further below, the per-port multicast processing techniques use a bit to represent each packet and create a per-port searchable hierarchical tree that is subsequently used to schedule the multicast packets. With completely independent structures for each port, the per-port hierarchical tree is scalable, able to support line rate performance even while simultaneously supporting different fan-out port speeds, and eliminates HOL blocking.

Figure 2:
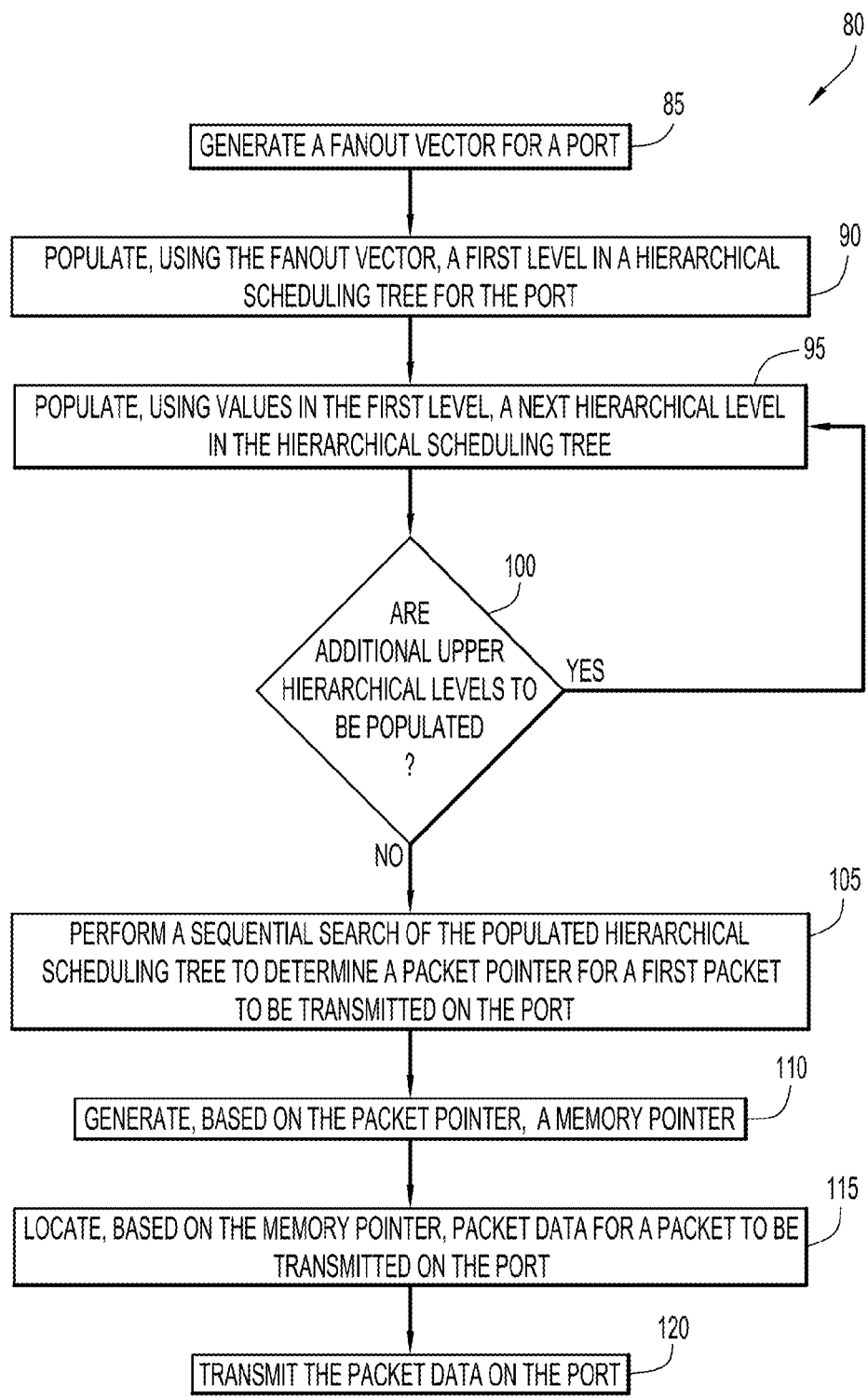
FIG. 2 is a flowchart of a method in accordance with the per-port multicast processing techniques presented herein.
Figure 3A:
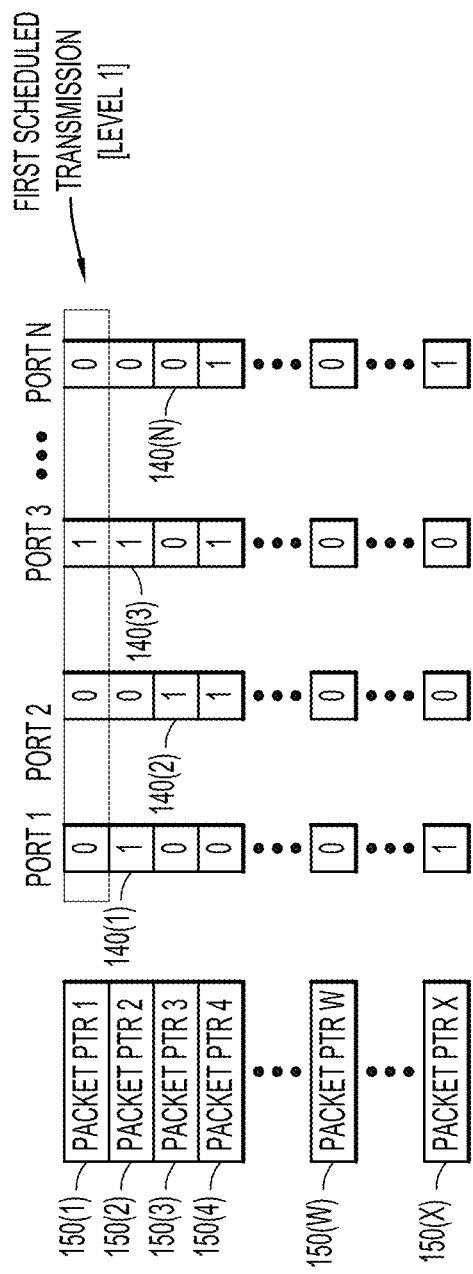
FIGS. 3A and 3B are diagrams illustrating data used during the example method of FIG. 2.
Figure 3B:
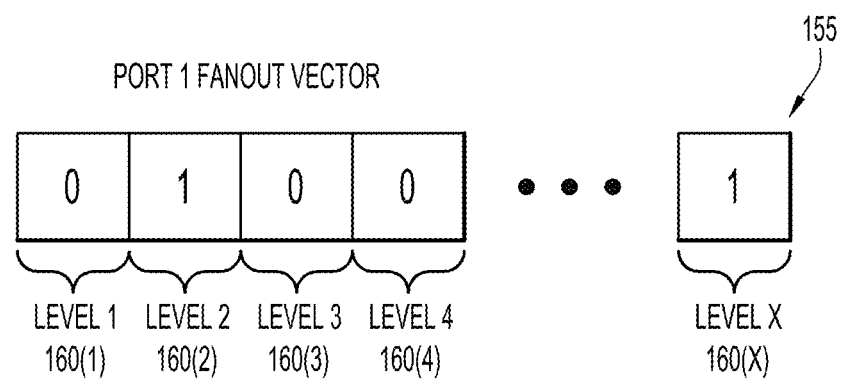
Figure 3C:
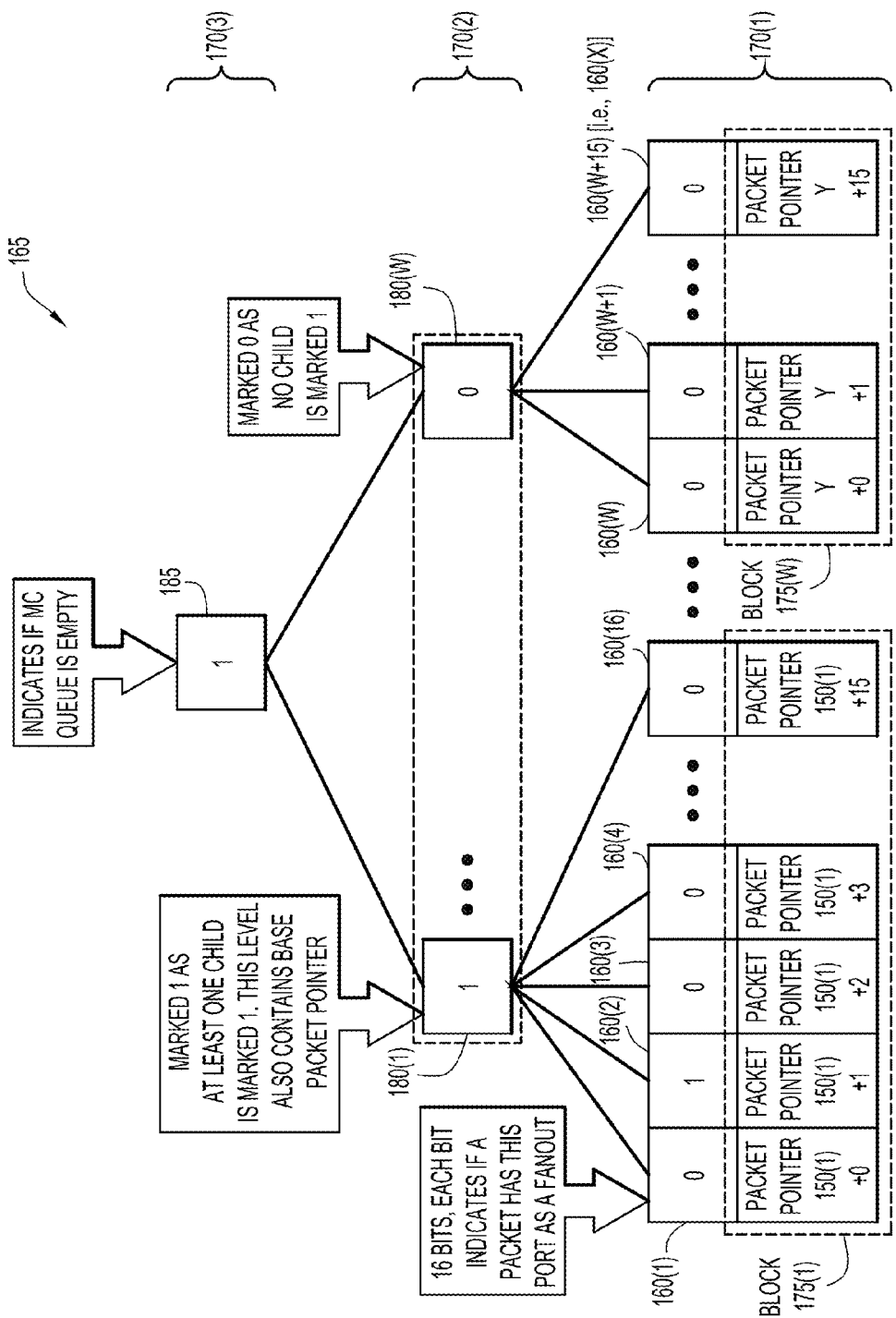
FIG. 3C is a diagram illustrating a hierarchical packet scheduling tree in accordance with examples presented herein.

FIG. 2 is a detailed flowchart illustrating an example method 80 in accordance with the per-port multicast processing techniques provided herein. FIGS. 3A and 3B are diagrams illustrating data used during the example method of FIG. 2, while FIG. 3C is representation of a hierarchical packet scheduling tree. For ease of illustration, method 80 will be described with reference to FIGS. 3A, 3B, and 3C, and with reference to a multicast networking device having a plurality of ports, referenced as ports 1 to port N.

In this example, received packets are replicated (as known) and scheduled for transmission via one of the ports 1 to N. More specifically, the packets are placed into one of a plurality of transmission queues 140(1)-140(N). In the example of FIG. 3A, there is one transmission queue per-port. Alternative examples may have multiple queues per port.

The first packets scheduled for transmission are at the first level (level 1) of the transmission queues 140(1)-140(N), while the last packets scheduled for transmission are at the last level (level x) of the transmission queues 140(1)-140(N). FIG. 3A illustrates packet pointers 150(1)-150(x) that each correspond to one level of the transmission queue. The packet pointers 150(1)-150(x) use a binary bit value of "1" to indicate that a packet is scheduled for a port at the corresponding level of the transmission queue, and a binary bit value "0" to indicate that there is no packet scheduled for that port at the corresponding level of the transmission queue. In other words, if the "packet fanout" includes a port, the packet pointer will include a bit value of 1 for that port. For example, in FIG. 1, the packet scheduled at the first level of the transmission queue has a packet fanout that only includes port 3, so the packet pointer 150(1) has a bit value of 1 at the port 3 location, and bit value of 0 at the other port locations.

Method 80 begins at 85 where the packet pointers 150(1)-150(x) are used to generate a fanout vector for each port. FIG. 3B illustrates an example fanout vector 155 for port 1 that includes vector entries 160(1)-160(x). The fanout vector 155 is a compilation of all of the bit values from all of the packet pointers at the port 1 locations. In other words, the first vector entry 160(1) in the fanout vector 155 corresponds to the port 1 bit value in packet pointer 150(1); the second entry 160(2) corresponds to the port 1 bit value in packet pointer 150(2), and so on. This fanout vector generation process may be performed for each port so that there are port-specific fanout vectors (i.e., one fanout vector for each of the ports 1 to N).

At 90, the fanout vectors are used to generate a hierarchical packet scheduling tree for each port. In other words, port-specific hierarchical packet scheduling trees are generated for each of the ports 1 to N. FIG. 3C illustrates an example hierarchical scheduling tree 165 for port 1 created from fanout vector 155.

As shown, hierarchical packet scheduling tree 165 includes three hierarchical levels 170(1)-170(3). The first hierarchical level 170(1) comprises the fanout vector 155 in which the vector entries 160(1)-160(x) are grouped into logical blocks 175(1)-175(w) each containing sixteen (16) vector entries. The size of these logical blocks may vary depending on the size of the fanout vector or based on other values.

As described above, each vector entry 160(1)-160(x) corresponds to an entry in a packet pointer associated with port 1. As such, each vector entry 160(1)-160(x) may be indexed with respect to a selected packet pointer. As shown, the first entry in block 175(1) is vector entry 160(1) from packet pointer 150(1). As such, packet pointer 150(1) is selected as the base packet pointer for indexing purposes, and each of the other entries in block 175(1) may be indexed with respect to packet pointer 150(1). Similarly, the first entry in block 175(w) is vector entry 160(w) from a packet pointer 150(w). As such, packet pointer 150(w) is selected as the base packet pointer for indexing purposes, and each of the other entries in block 175(w) may be indexed with respect to packet pointer 150(w). This indexing is shown in FIG. 3C.

At 95, the next (upper) hierarchical level in hierarchical scheduling tree 165 is populated based on values in lower level blocks 175(1)-175(w). More specifically, as shown in FIG. 3C, the next hierarchical level 170(2) includes entries 180(1)-180(w) corresponding to the lower blocks 175(1)-175(w), respectively. In other words, there is a one-to-one correspondence between an entry in the second level 170(2) and a block in the first level 170(1). If any entry in a lower block 175(1)-175(w) has a bit value of 1, then the corresponding entry 180(1)-180(w) in level 170(2) will have a bit value of 1. However, if all entries in a lower block 175(1)-175(w) have a bit value of 0, then the corresponding entry 180(1)-180(w) in level 170(2) will have a bit value of 0.

In the example of FIG. 3C, block 175(1) includes a vector entry 160(2) that has a bit value of 1. As such, the corresponding upper level entry 180(1) is populated with the bit value of 1. In contrast, all of the entries in block 175(w) have bit values of 0. As such, the corresponding upper level entry 180(w) is populated with the bit value of 0.

As noted, an upper level entry set to the bit value of 1 means that there is a packet for transmission on the port at a location identified in the corresponding lower level block. In order to be able to locate this packet, a linked list is created for any such upper level entries having a bit value of 1. In the example of FIG. 3C, a linked list is created for entry 180(1), but not for entry 180(w) since all entries in block 175(w) have a bit value of 0. As described further below, the linked list may be used to identify/locate the packet that is to be transmitted (i.e., to locate the packet corresponding to vector entry 160(2)).

At 100, a determination is made as to whether there are additional upper hierarchical levels that are to be populated. This determination is made, for example, by determining if more than one entry exists in the current hierarchical level. If more than one entry exists, method 80 returns to 95 where the next level is populated. However, if only one entry exists, method 80 proceeds to 105. In the example of FIG. 3C, the next level 170(3) is the highest level and only includes one entry 185.

In the example of FIG. 3C, entry 180(1) has a bit value of 1 because there is a corresponding bit value of 1 in lower level block 175(1). As such, the upper level entry 185 is populated with the bit value of 1. In an alternative example, if all of the entries in blocks 175(1)-175(w) had bit values of 0, then the corresponding upper level entries 180(1)-180(w) would have bit values of 0 and entry 185 would thus be populated with a bit value of 0.

As noted, an upper level entry set to the bit value of 1 means that there is a packet for transmission on the port at a location identified in the corresponding lower level block. In order to be able to locate this packet, another linked list is created for any such upper level entries having a bit value of 1. In the example of FIG. 3C, a linked list is created for entry 185. As described further below, the linked list may be used to identify/locate the packet that is to be transmitted (i.e., to locate the packet corresponding to vector entry 160(2)).

At 105, a sequential search of the populated hierarchical scheduling tree 165 is conducted with a dequeue engine corresponding to port 1. More particularly, the dequeue engine will first examine the highest level in the hierarchical scheduling tree 165 to determine if the entry 185 at this level has a bit value of 0 or 1. If the bit value is zero, the dequeue engine determines that there are no packets that need to be transmitted on this port (i.e., the multicast queue for this port is empty) and the method ends. However, if entry 185 has a bit value of 1, then the linked list for entry 185 is used to locate the entry 180(1) in the next level 170(2) that has a bit value of 1. After this entry 180(1) is located, the linked list for entry 180(1) is used to locate the block 175(1) in the next level 170(1) that includes a bit value of 1. The bit position of the first bit value of 1 (vector entry 160(2)) is located and is used to determine (infer) the packet pointer for that entry.

At 110, the packet pointer is used to generate a memory pointer and at 115 the memory pointer is used to locate the packet for transmission on port 1. At 120, the packet is transmitted on port 1.

In summary, the hierarchical packet scheduling tree allows for indirect derivation of the packet pointer, and there is no need to wait for the pointer to reach the head-of-the-line (i.e., the front of the transmission queue). Since each port operates independently on its own data structure, there are no HOL blocking issues.

FIGS. 2, 3A, 3B, and 3C illustrate the use of the hierarchical packet scheduling tree 165 that has three levels. It is to be appreciated that hierarchical packet scheduling trees in accordance the per-port multicast processing techniques may have any number of levels, depending on, for example, the length of the transmission queues or other values. In examples that use more than three levels, several lower levels (i.e., first, second, third, etc.) may be organized into blocks of entries as discussed above. It is also to be appreciated that the hierarchical data structure may be created in real-time as it is first populated or it may be pre-created and subsequently populated.

Figure 4:
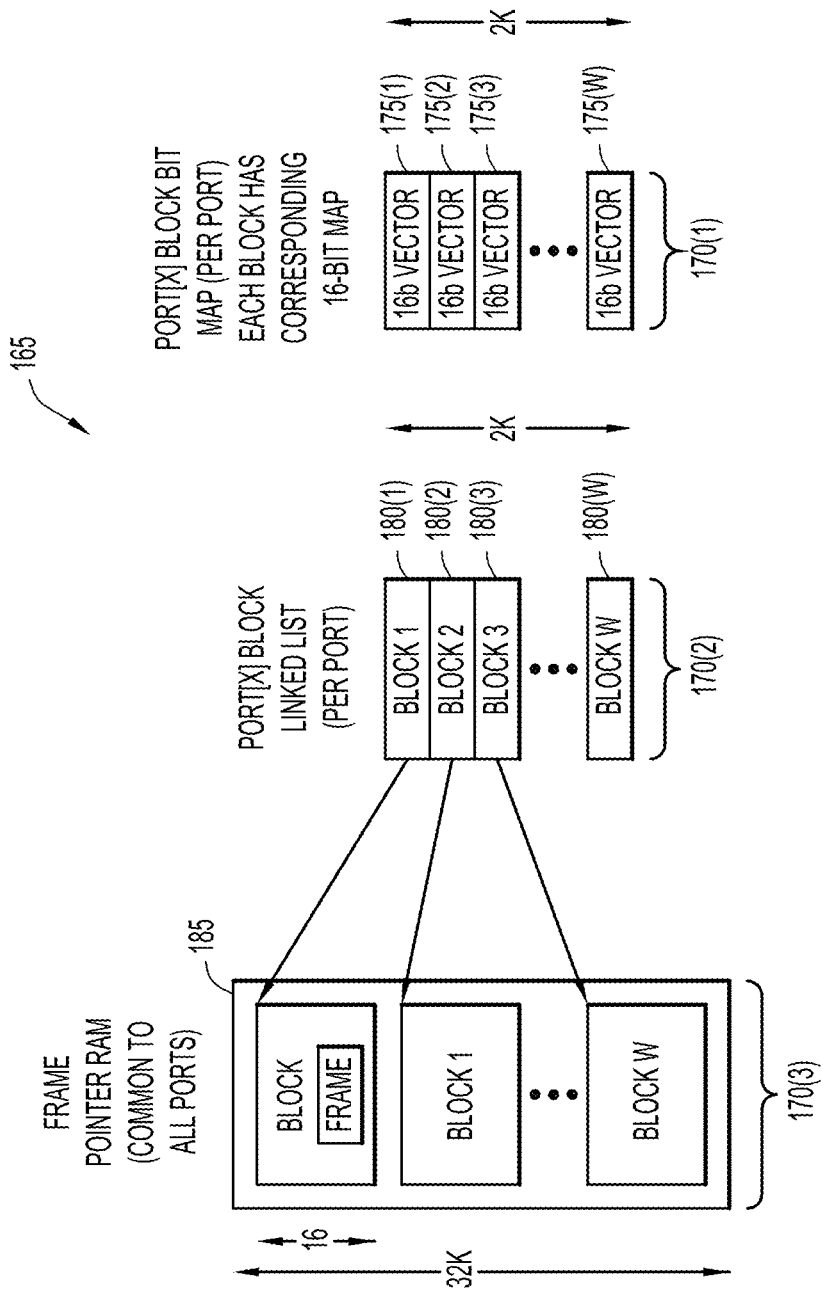
FIG. 4 is an alternative illustration of a hierarchical packet scheduling tree in accordance with examples presented herein.

FIG. 4 is a block diagram providing an alternative illustration of hierarchical scheduling tree 165 of FIG. 3C. As shown, a port fanout vector 155 for port 1 is logically grouped into blocks 175(1)-175(w) that comprise 16 bit sections (16b vector) of the fanout vector. These blocks form the first level 170(1) of the hierarchical scheduling tree 165. The entries 180(1)-180(w) in the second level 170(2) each correspond to a lower level block. As noted above, any entries 180(1)-180(w) that have a bit value of 1 will also have a linked list so as to link the entries to the lower block (as needed) on a per-port basis. Also as described above, the entry 185 in level 170(3) corresponds to all of the entries 180(1)-180(w) and a linked list may be created, as needed.

In summary, every block 175(1)-175(w) can store up to 16 frames in the same multicast queue in the order that they are received. Each frame corresponds to a packet for transmission on the subject port (port 1 in FIG. 4). In other words, the first level of the hierarchical scheduling tree is implemented using groups of 16-bit vectors with each bit representing a packet. The second level of the hierarchical scheduling tree is implemented using a linked list of blocks. If at least one bit is set (i.e., has a bit value of 1) in a block for port 1, the block pointer is pushed into port 1 block pointer linked list. The third level indicates if the entire queue is empty or if there is a packet for transmission.

Figure 5:
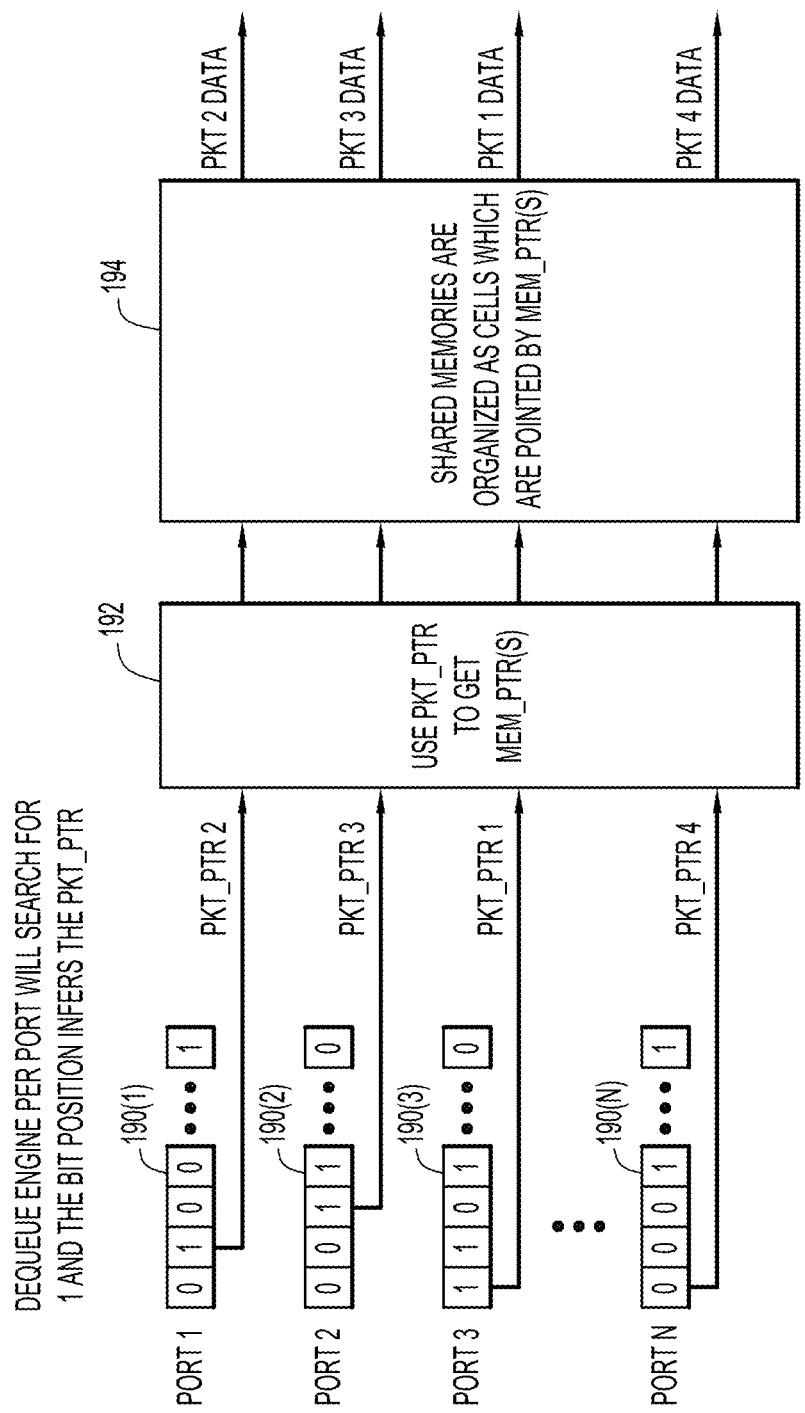
FIG. 5 is a diagram illustrating the use of a hierarchical packet scheduling tree in accordance with examples presented herein.
Figure 6:
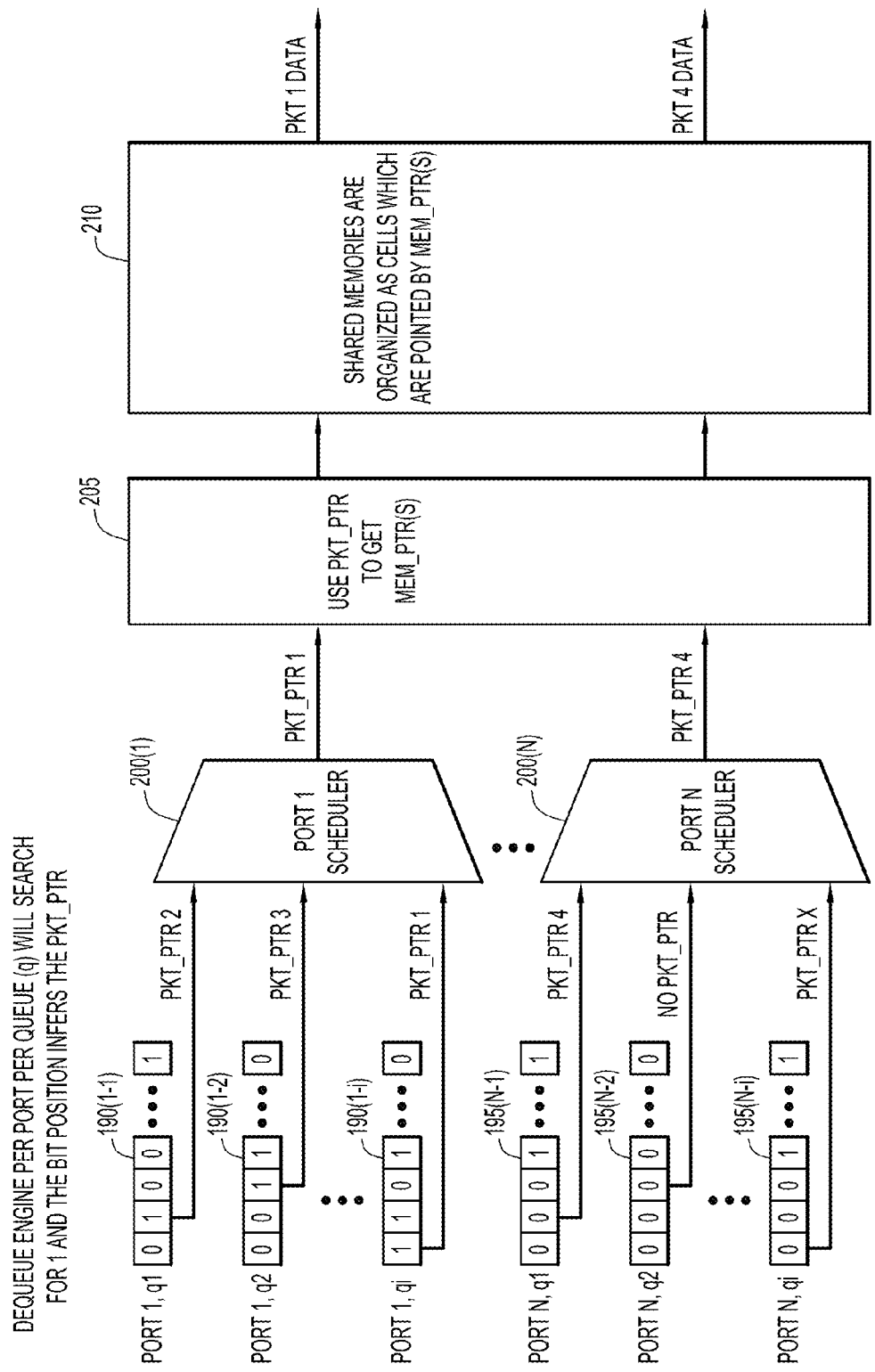
FIG. 6 is a diagram illustrating an alternative use of a hierarchical packet scheduling tree in accordance with examples presented herein.

FIGS. 5 and 6 are block diagrams illustrating use of a hierarchical packet scheduling tree by example dequeue engines. These dequeue engines may correspond to the dequeue engines of FIG. 1. FIG. 5 illustrates dequeue engine engines that operate with one queue per-port, while FIG. 6 illustrates dequeue engines that operate with multiple queues per-port.

In the example of FIG. 5, there are N ports (ports 1 to port N), and a packet queue 190(1)-190(N) each associated with a port. As explained in detail with reference to FIGS. 2-4, the packet queues are used to create a hierarchical packet scheduling tree for each port. The dequeue engine for a port will search its corresponding hierarchical packet scheduling tree to locate the bit position of the first packet for transmission on that port. The dequeue engine uses the bit position to determine (infer) a pointer to that packet, referred to as a packet pointer (pkt_ptr). At 192, the packet pointer is used to generate a memory pointer (mem_ptr). The packet data for the queued packets are stored in a shared memory, and, at 194, the memory pointer is used to locate the packet data. The packet may then be transmitted on the port.

In the example of FIG. 6, there are N ports (ports 1 to port N), but multiple packet queues for each port. For example, shown in FIG. 6 are queues 195(1-1) to 195(1-i) for port 1 and queues 195(N-1) to 195(N-i) for port N. As explained in detail with reference to FIGS. 2-4, each of the packet queues are used to create a hierarchical packet scheduling tree. However, in contrast to the above examples, the example of FIG. 6 will have multiple hierarchical packet scheduling trees for each port, one for each queue. The dequeue engine for a port will search its corresponding hierarchical packet scheduling trees to locate the bit position of the first packet for transmission from a particular queue. The dequeue engine uses the bit positions to determine packet pointer for those packets. This example includes port schedulers 200(1) to 200(N) that are each associated with one of the ports. The port scheduler will select one of the packets (if multiple packets are scheduled for transmission), and, at 205, use the packet pointer for the selected packet to generate a memory pointer (mem_ptr). The packet data for the queued packets are stored in a shared memory, and, at 210, the memory pointer is used to locate the packet data. The packet may then be transmitted on the port.

Figure 7:
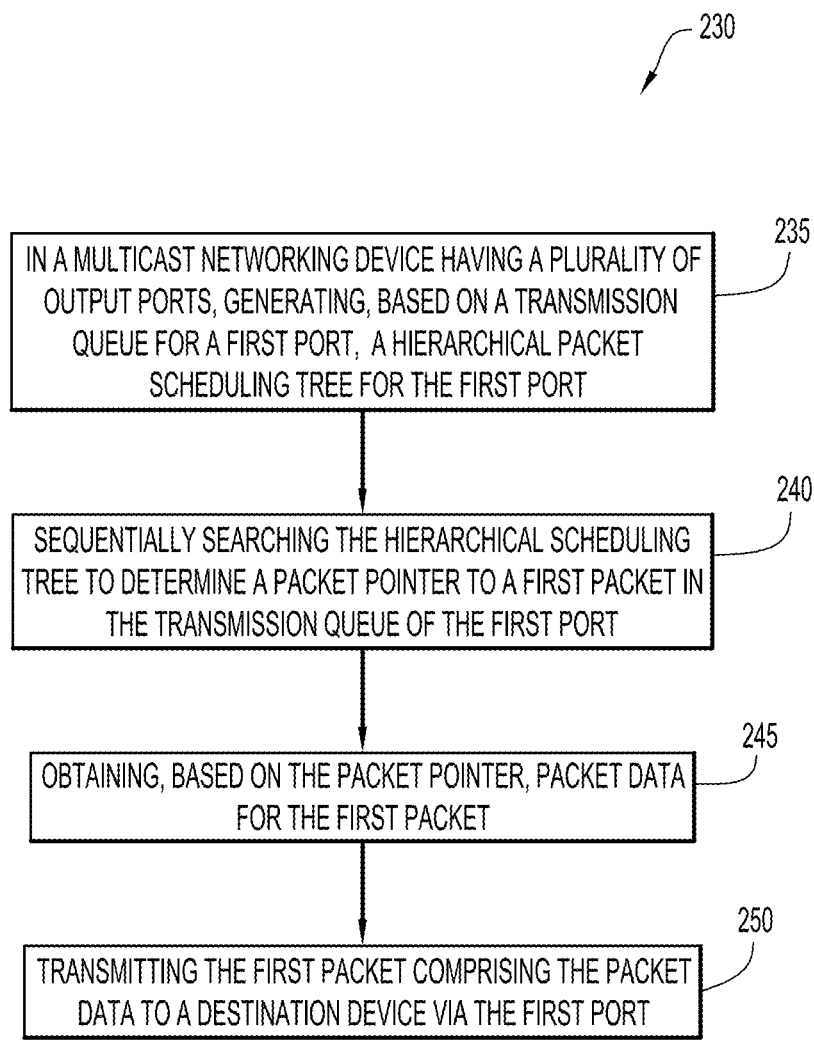
FIG. 7 is a high-level flowchart of a method in accordance with per-port multicast processing techniques presented herein.

FIG. 7 is a high-level flowchart of a method 230 in accordance with per-port multicast processing techniques. Method 230 begins at 235 where, in a multicast networking device having a plurality of output ports, a hierarchical packet scheduling tree for a first port is generated from a transmission queue for the first port. At 240, the hierarchical scheduling tree is sequentially searched to determine a packet pointer to a first packet in the transmission queue of the first port. At 245, based on (using) the packet pointer, packet data for the first packet is obtained. At 250, the first packet comprising the packet data is transmitted to a destination device via the first port.

The per-port multicast processing techniques presented herein use a compact and searchable per-port (i.e., port-specific) tree to schedule multicast packets. The use of this data structure eliminates the issues pertinent to multicast replication and improves multicast performance even while simultaneously supporting ports having different speeds (e.g., 1GE/10GE/40GE/100GE speeds). The per-port multicast processing techniques may also eliminate HOL blocking between fanout ports, and the compact representation of the fanouts makes implementation feasible for switch-on-chip solutions.

The above description is intended by way of example only.

What is claimed is:

1. A method comprising:
   in a multicast networking device having a plurality of output ports, generating a hierarchical packet scheduling tree for a first port from a transmission queue for the first port, wherein the hierarchical packet scheduling tree has a plurality of levels each with one or more entries;
   sequentially searching the hierarchical scheduling tree from a higher level to a lower level to determine a packet pointer to a first packet in the transmission queue of the first port by determining that an entry in a highest level of the hierarchical packet scheduling tree has a binary bit value of one of one or zero, wherein the binary bit value of the one of one or zero indicates at least one packet is in the transmission queue to be sent by the first port, and sequentially searching any additional levels of the hierarchical packet scheduling tree to determine a bit position for the first packet;
   obtaining, based on the packet pointer, packet data for the first packet; and
   transmitting the first packet comprising the packet data to a destination device via the first port.

2. The method of claim 1, wherein generating the hierarchical packet scheduling tree comprises:
   obtaining a fanout vector for the transmission queue of the first port, wherein the fanout vector includes a plurality of binary bit entries that each correspond to a location in the transmission queue for the first port;
   populating the lower level of the hierarchical packet scheduling tree with the fanout vector;
   grouping the lower level of the hierarchical packet scheduling tree into a plurality of blocks each containing a plurality of binary bit entries; and
   populating one or more entries in at least the higher level of the hierarchical packet scheduling tree such that each entry in the higher level corresponds to one of the plurality of blocks.

3. The method of claim 2, wherein populating a first entry in the higher level of the hierarchical packet scheduling tree such that the entry in the higher level corresponds to one of the plurality of blocks, comprises:
   determining at least one of the binary bit entries in the block corresponding to the first entry have a binary value of one of one or zero, wherein the binary value of the one of one or zero indicates at least one packet is in the transmission queue to be sent by the first port; and
   populating the first entry with a binary bit value of the one of one or zero.

4. The method of claim 3, further comprising:
   if any of the binary bit entries in the block corresponding to the first entry have the binary value of the one of one or zero, creating a linked list for the first entry.

5. The method of claim 2, further comprising:
   determining that one or more additional levels in the hierarchical packet scheduling tree should be populated; and
   sequentially populating entries of each of the one or more additional levels of the hierarchical packet scheduling tree such that each entry in a next level corresponds to a group of entries in a previous level.

6. The method of claim 1, further comprising:
   determining the packet pointer from the bit position of the first packet.

7. The method of claim 1, wherein obtaining packet data for the first packet comprises:
   determining, based on the packet pointer, a memory pointer identifying a memory location storing the packet data for the first packet; and
   accessing the memory location identified by the memory pointer to obtain the packet data for the first packet.

8. One or more non-transitory computer readable storage media encoded with software comprising computer executable instructions and when the software is executed operable to:
   in a multicast networking device having a plurality of output ports, generate a hierarchical packet scheduling tree for a first port from a transmission queue for the first port, wherein the hierarchical packet scheduling tree has a plurality of levels each with one or more entries;
   sequentially search the hierarchical scheduling tree from a higher level to a lower level to determine a packet pointer to a first packet in the transmission queue of the first port by determining that an entry in a highest level of the hierarchical packet scheduling tree has a binary bit value of one of one or zero, wherein the binary bit value of the one of one or zero indicates at least one packet is in the transmission queue to be sent by the first port, and sequentially searching any additional levels of the hierarchical packet scheduling tree to determine a bit position for the first packet;

obtain, based on the packet pointer, packet data for the first packet; and transmit the first packet comprising the packet data to a destination device via the first port.

9. The computer readable storage media of claim 8, wherein the instructions operable to generate the hierarchical packet scheduling tree comprise instructions operable to:

obtain a fanout vector for the transmission queue of the first port, wherein the fanout vector includes a plurality of binary bit entries that each correspond to a location in the transmission queue for the first port;

populate the lower level of the hierarchical packet scheduling tree with the fanout vector;

group the lower level of the hierarchical packet scheduling tree into a plurality of blocks each containing a plurality of binary bit entries; and populate one or more entries in at least the higher level of the hierarchical packet scheduling tree such that each entry in the higher level corresponds to one of the plurality of blocks.

10. The computer readable storage media of claim 9, wherein the instructions operable to populate the one or more entries in at least the higher level of the hierarchical packet scheduling tree such that each entry in the higher level corresponds to one of the plurality of blocks, comprise instructions operable to:

determine that at least one of the binary bit entries in the block corresponding to a first entry have a binary value of one of one or zero, wherein the binary value of the one of one or zero indicates at least one packet is in the transmission queue to be sent by the first port; and populate the first entry with a binary bit value of the one of one or zero.

11. The computer readable storage media of claim 10, further comprising instructions operable to:

create a linked list for the first entry.

12. The computer readable storage media of claim 9, further comprising instructions operable to:

determine whether one or more additional levels in the hierarchical packet scheduling tree should be populated; and if additional levels should be populated, sequentially populate entries of each of the one or more additional levels of the hierarchical packet scheduling tree such that each entry in a next level corresponds to a group of entries in a previous level.

13. The computer readable storage media of claim 8, further comprising instructions operable to:

determine the packet pointer from the bit position of the first packet.

14. The computer readable storage media of claim 8, wherein the instructions operable to obtain packet data for the first packet comprise instructions operable to:

determine, based on the packet pointer, a memory pointer identifying a memory location storing the packet data for the first packet; and access the memory location identified by the memory pointer to obtain the packet data for the first packet.

15. An apparatus comprising:

a plurality of input ports configured to receive packets from one or more source devices;

a plurality of output ports;

a memory comprising one or more transmission queues for the output ports; and a processor that:

replicates one or more of the received packets, schedules packets in the transmission queues, generates a hierarchical packet scheduling tree for a first port from a transmission queue for the first port, wherein the hierarchical packet scheduling tree has a plurality of levels each with one or more entries, sequentially searches the hierarchical scheduling tree from a higher level to a lower level to determine a packet pointer to a first packet in the transmission queue of the first port by determining that an entry in a highest level of the hierarchical packet scheduling tree has a binary bit value of one of one or zero, wherein the binary bit value of the one of one or zero indicates at least one packet is in the transmission queue to be sent by the first port, and sequentially searching any additional levels of the hierarchical packet scheduling tree to determine a bit position for the first packet, obtains, based on the packet pointer, packet data for the first packet, and transmits the first packet comprising the packet data to a destination device via the first port.

16. The apparatus of claim 15, wherein to generate the hierarchical packet scheduling tree, the processor:

obtains a fanout vector for the transmission queue of the first port, wherein the fanout vector includes a plurality of binary bit entries that each correspond to a location in the transmission queue for the first port;

populates the lower level of the hierarchical packet scheduling tree with the fanout vector;

groups the lower level of the hierarchical packet scheduling tree into a plurality of blocks each containing a plurality of binary bit entries; and populates one or more entries in at least the higher level of the hierarchical packet scheduling tree such that each entry in the higher level corresponds to one of the plurality of blocks.

17. The apparatus of claim 16, wherein to populate a first entry in the higher level of the hierarchical packet scheduling tree such that the entry in the higher level corresponds to one of the plurality of blocks, the processor:

determines that at least one of the binary bit entries in the block corresponding to the first entry have a binary value of one of one or zero, wherein the binary value of the one of one or zero indicates at least one packet is in the transmission queue to be sent by the first port; and populates the first entry with a binary bit value of the one of one or zero.

18. The apparatus of claim 17, wherein the processor:

if any of the binary bit entries in the block corresponding to the first entry have the binary value of the one of one or zero, creates a linked list for the first entry.

19. The apparatus of claim 16, wherein the processor:

determines whether one or more additional levels in the hierarchical packet scheduling tree should be populated; and if additional levels should be populated, sequentially populates entries of each of the one or more additional levels of the hierarchical packet scheduling tree such that each entry in a next level corresponds to a group of entries in a previous level.

20. The apparatus of claim 15, wherein the processor:
determines the packet pointer from the bit position of the first packet.

21. The apparatus of claim 15, wherein to obtain packet data for the first packet the processor:
determines, based on the packet pointer, a memory pointer identifying a memory location storing the packet data for the first packet; and
accesses the memory location identified by the memory pointer to obtain the packet data for the first packet.

22. The method of claim 1, wherein the binary bit value of the one of one or zero indicates at least one packet is in the transmission queue to be sent by the first port when the binary value has a value of one.

23. The computer readable storage media of claim 8, wherein the binary bit value of the one of one or zero indicates at least one packet is in the transmission queue to be sent by the first port when the binary value has a value of one.

24. The apparatus of claim 15, wherein the binary bit value of the one of one or zero indicates at least one packet is in the transmission queue to be sent by the first port when the binary value has a value of one.

\* \* \* \* \*